United States Patent [19]

Kumar et al.

[11] Patent Number: 5,638,257

[45] Date of Patent: Jun. 10, 1997

[54] COMBINATION KEYBOARD AND COVER FOR A HANDHELD COMPUTER

[75] Inventors: Rajendra Kumar; John W. Morrison, II, both of Akron, Ohio

[73] Assignee: Khyber Technologies Corporation, Fairlawn, Ohio

[21] Appl. No.: 699,483

[22] Filed: Aug. 19, 1996

Related U.S. Application Data

[63] Continuation of Ser. No. 379,254, Jan. 27, 1995, Pat. No. 5,548,477.

[51] Int. Cl.$^6$ .................................. G06F 1/16; H05K 7/02
[52] U.S. Cl. ............................ 361/680; 361/681; 361/727
[58] Field of Search ................................. 361/680, 681, 361/682, 724, 679, 683, 725, 727; 364/708.1; 400/88, 682; G06F 1/16

[56] References Cited

U.S. PATENT DOCUMENTS 4,237,540  12/1980  Sato ................................... 364/708.1
5,057,676  10/1991  Komaki ............................. 364/708.1
5,278,779   1/1994  Conway et al. .................. 364/708.1
5,383,138   1/1995  Motoyama et al. ............. 364/708.1

Primary Examiner—Michael W. Phillips
Assistant Examiner—Lynn D. Field
Attorney, Agent, or Firm—Howard S. Robbins

[57] ABSTRACT

A device (10) adding apparatus as a keyboard input to a handheld computer (12) lacking such input (such as pen computers and personal digital assistants) includes a keyboard (11) and a planar motion pivot mechanism (30). Planar motion pivot mechanism (30) includes a body (31) formed as a boot that encloses an end of the handheld computer (12), and a pivot pin (32). The user simply rotates keyboard (11) from a nonoperational position substantially covering the handheld computer display (14), to an operational position at substantially a right angle to the display (14).

7 Claims, 2 Drawing Sheets

COMBINATION KEYBOARD AND COVER FOR A HANDHELD COMPUTER

This application is a continuation of U.S. patent application Ser. No. 08/379,254, filed on Jan. 27, 1995, which is to issue as U.S. Pat. No. 5,545,477 on Aug. 20, 1996.

TECHNICAL FIELD

The present invention relates in general to processor based devices operable while being held in its user's hand, such as a handheld computer. More particularly, the present invention pertains to handheld computing devices lacking one or more type of input mechanism. More specifically, the present invention relates to handheld computing devices such as a handheld pen computer or personal digital assistant which omit a keyboard.

BACKGROUND ART

Portable computing and communication devices are quickly becoming ubiquitous tools for both business and personal activities. The smallest and lightest of these devices are suitable for and most often carried and operated while being held in the hand of its user. Typical of these devices are the variety of so-called pen computers and personal digital assistants (PDAs) now commercially available. Whereas historically user input to computing and communication devices has been primarily through a keyboard, pen computers and PDAs have eliminated the keyboard, not only because its size and weight often make it inconvenient and impracticable to carry and use, but also because many mobile tasks require a more limited extent of textual input. As experience with these devices has increased, however, it has been recognized that from time to time nearly all applications and users would benefit from the ability to perform keyboard input.

Efforts have been made to provide both portable computers and pen computers in a single housing. These efforts have all involved repositioning the display of a laptop computer so that it covers and hides the keyboard, typically in the manner of a tablet. Exemplary of these efforts are the laptop computers shown in U.S. Pat. Nos. 5,276,589 and 5,268,816 in which the display is mounted to slide or pivot in three-dimensions over the keyboard; the laptop computer shown in U.S. Pat. No. 5,241,303 in which the display and keyboard detach and are repositioned with the display lying flat and the keyboard stored in a compartment under the display; and the ThinkPad Model 750P laptop computer manufactured by International Business Machines Corporation of White Plains, N.Y. in which the display is carried on an articulated arm which moves in three-dimensions to allow the display to be repositioned directly over the keyboard.

No matter what the approach, such efforts invariably produce units that are large, heavy, expensive, complex and difficult and cumbersome to transform from keyboard input to keyboardless operation. Moreover, these efforts do not adapt to pen computers and PDAs currently in use.

Some pen computers and PDAs presently commercially available do include a socket to connect to the cable from a conventional keyboard. However, given the inconvenience of carrying, connecting and operating a completely external keyboard, existing pen computer and PDA users almost universally elect to go without keyboard input even in those relative frequently occurring situations in which it would be beneficial.

SUMMARY OF THE INVENTION

It is, therefore, an object of the present invention to provide a device that permits the inclusion of a keyboard with a keyboardless handheld computer.

It is another object of the present invention to provide a device, as set forth above, which is simple to move from an operational to a nonoperational position.

It is still another object of the present invention to provide a device, as set forth above, that is as compact as the handheld computer, inexpensive to manufacture and uncomplicated.

It is yet another object of the present invention to provide a device, as set forth above, that may be removably added to existing and new handheld computers.

These and other objects and advantages of the present invention over existing prior art forms will become more apparent and fully understood from the following description in conjunction with the accompanying drawings.

In general, a device in accordance with the present invention includes a handheld first apparatus having a display, a second apparatus in operative association with the handheld first apparatus, and a planar motion mechanism carrying one of the handheld first apparatus and the second apparatus. The handheld first apparatus includes a first surface from which at least a portion of the display may be viewed. The second apparatus includes a second surface, and the second apparatus is movable between an operational position and a nonoperational position. The planar motion mechanism allows planar motion between the second surface and the first surface whereby the second apparatus may be selectably moved between the operational position and the nonoperational position.

PREFERRED EMBODIMENT FOR CARRYING OUT THE INVENTION

Figure 1:
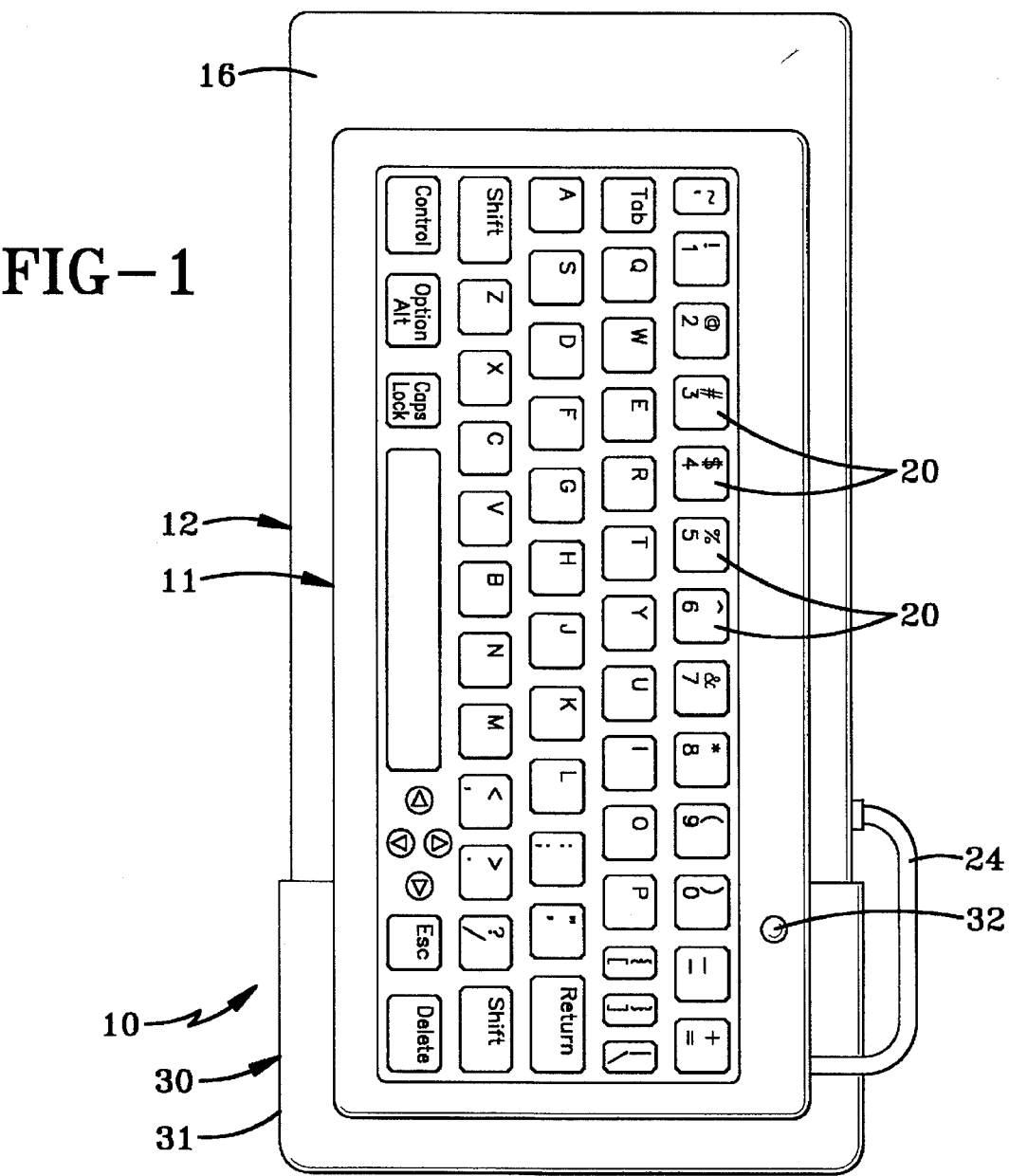
FIG. 1 is a top plan view of an exemplary device in accordance with the present invention depicting a combination keyboard and cover in its closed position atop the display of a handheld computer.
Figure 2:
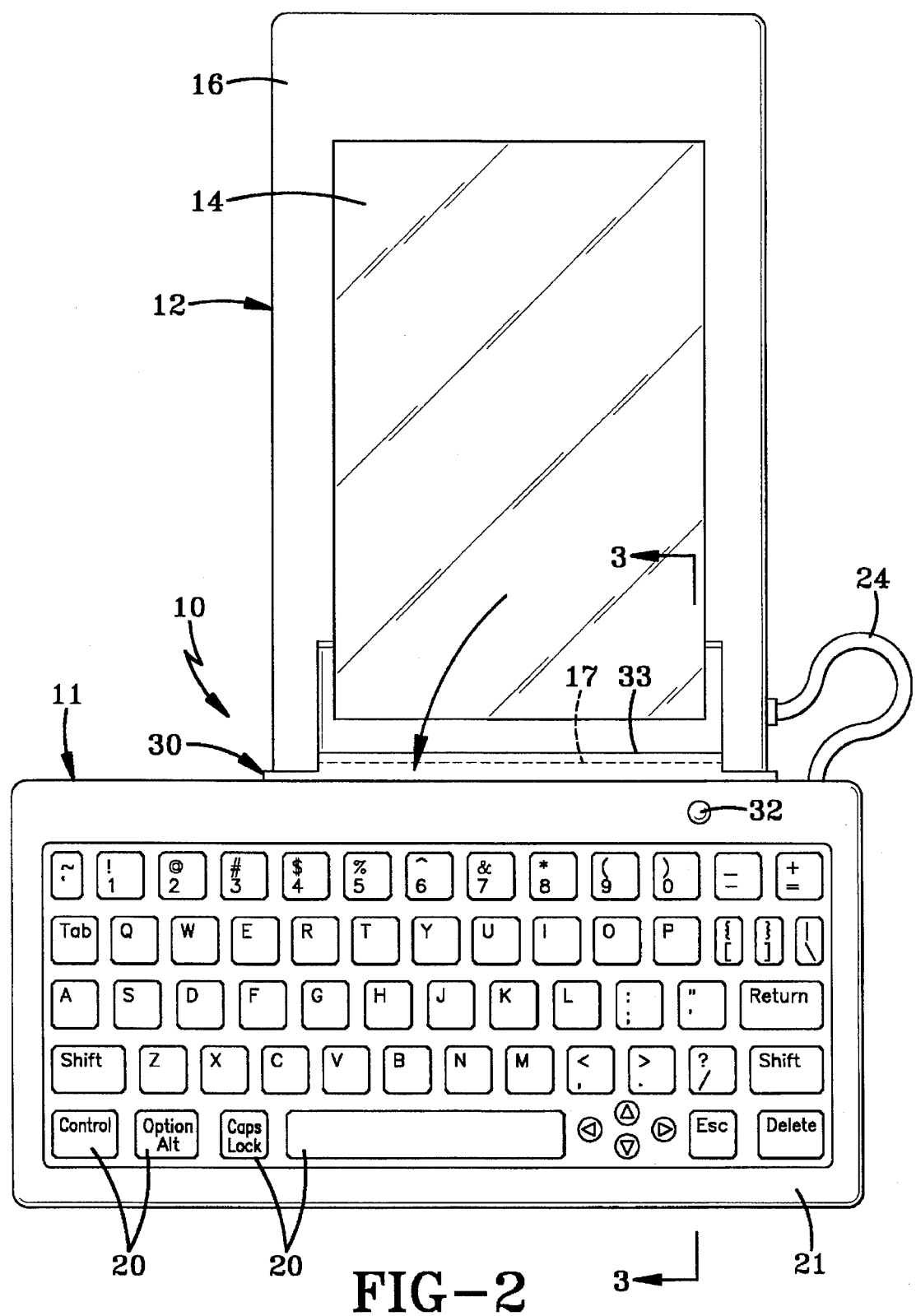
FIG. 2 is a top plan view of the device shown in FIG. 1 in which the combination keyboard and cover has been pivoted to its open position with the keyboard in an operational position at a substantially right-angle to the longitudinal axis of the display in the handheld computer.

FIGS. 1 and 2 present a top plan view of an exemplary device in accordance with the present invention, generally indicated by the numeral 10, for providing apparatus such as a keyboard input apparatus 11 to a handheld computer 12, such as a pen computer or a personal digital assistant (PDA). In the handheld computer 12 depicted in the Figures, a display 14 is recessed in a well 15 so as to be flush with the outside surface 16 of handheld computer 12.

Keyboard input apparatus 11 includes a plurality of keys 20 carried within an upper housing 21, and a mating, lower housing 22. One corner of the mated upper housing 21 and the lower housing 22 includes a cylindrical chamber 23 for receiving a pivot pin as explained hereinafter. A cable 24 including multiple electrical power and data conductors extends between keyboard 11 and handheld computer 12. The length of cable 24 may be minimized if cable 24 enters or engages keyboard 11 in proximity to chamber 23 and the location at which cable 24 enters or engages handheld computer 12.

Keyboard 11 is preferably no larger in area than that of display 14 and is as thin and light as possible. Nevertheless, the skilled artisan will appreciate the desirability of configuring keyboard 11 with an acceptable balance of size, weight and tactile operating characteristics.

Figure 3:
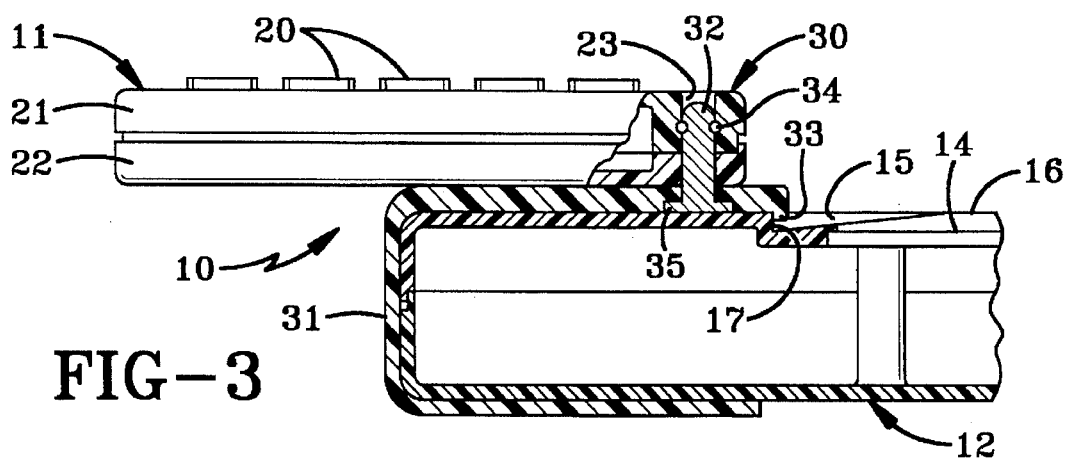
FIG. 3 is a fragmentary, elevational view through the device shown in FIG. 1 taken substantially along the line 3—3 of FIG. 2 and depicting the combination keyboard and cover in its open position.

In addition to the keyboard 11, device 10 includes broadly a keyboard positioning mechanism 30, best seen in the fragmentary, elevational view of FIG. 3 taken substantially along the line 3—3 of FIG. 2. Keyboard positioning mechanism 30 includes a body 31 configured and adapted to fit securely over and be carried by one end of handheld computer 12, and a pivot pin 32 for allowing keyboard 11 to rotate in a single plane relative to the position of display 14. Body 31 may be formed as a five-sided boot that slips over an end of handheld computer 12 and is secured by interference fit and an integrally formed flange 33 that engages a lower edge 17 of well 15 in which display 14 is recessed. Pivot pin 32 is inserted into chamber 23 and may be secured by a C-clip 34 or other suitable means affixed thereto on the inside of upper housing 21. Various well known techniques many be employed to maximize the strength of pivot pin 32, as by including a broadened pivot base 35, forming pivot 32 out of metal, and integrally forming pivot 32 as a part of body 31. Stop ridges may be formed into the underside of lower housing 22 to limit the extent of rotational travel of keyboard 11.

It should now be apparent that keyboard 11 pivots in a single plane between an orientation that may be called its non-operational or closed position directly atop display 14 as shown in FIG. 1, and an orientation that may be called its operational or open position, cantilevered atop body 31 and the end of handheld computer 12 over which body 31 is placed, and at a substantially right angle to display 14. Inasmuch as the keys 20 and display 14 are both facing in the same direction, and only a simple planer motion is required to move between operational and nonoperational orientations, the difficulties discussed hereinbefore are avoided.

Several modifications within the spirit of the present invention now should be evident to the skilled artisan. For example, while the embodiment described herein may be best suited as an attachment to an existing keyboardless handheld computer, if the housing of handheld computer is formed to include or permit direct attachment of a pivot or other suitable planar motion mechanism, the need for body 31 may be eliminated and keyboard 11 made a more integral part of the handheld computer. Alternatively, keyboard 11 and its pivot or other planar motion mechanism may be carried internal to the housing of the handheld computer, and the keyboard selectively moved to an operational orientation outside the housing of the handheld computer. Also, the present invention may be employed with any input device omitted from the handheld computer, and encompasses other forms of planar motion such as sliding.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of adding omitted functionality to handheld computing devices and, more particularly, adding keyboards to pen computers and PDAs.

We claim:

1. A device comprising:

a handheld first apparatus having a display including a first surface from which at least a portion of the display may be viewed;

a second apparatus in operative association with said handheld first apparatus including a second surface, said second apparatus movable between an operational position and a nonoperational position; and, a planar motion mechanism carrying one of said handheld first apparatus and said second apparatus and allowing planar motion between said second surface and said first surface whereby said second apparatus may be selectably moved between said operational position and said nonoperational position.

2. A device, as set forth in claim 1, wherein said first input is a keyboard.

3. A device, as set forth in claim 2, wherein said planar motion mechanism includes a pivot pin and a body carried by said handheld apparatus and carrying said pivot pin and said keyboard, said keyboard rotating about said pivot pin.

4. A device, as set forth in claim 3, wherein said handheld apparatus has an end and said body is a boot that encloses said end of said handheld apparatus.

5. A device, as set forth in claim 4, wherein said keyboard is at substantially a right angle to said display when said keyboard is in said operational position.

6. A device, as set forth in claim 5, wherein said keyboard substantially covers said display when said keyboard is in said nonoperational position.

7. A device, as set forth in claim 2, wherein said handheld apparatus is one of a pen computer and personal digital assistant.

* * * * *